Oct. 28, 1941.　　　F. H. HOPKINS　　　2,261,029
INDICATING INSTRUMENT
Filed March 16, 1940　　　2 Sheets-Sheet 1
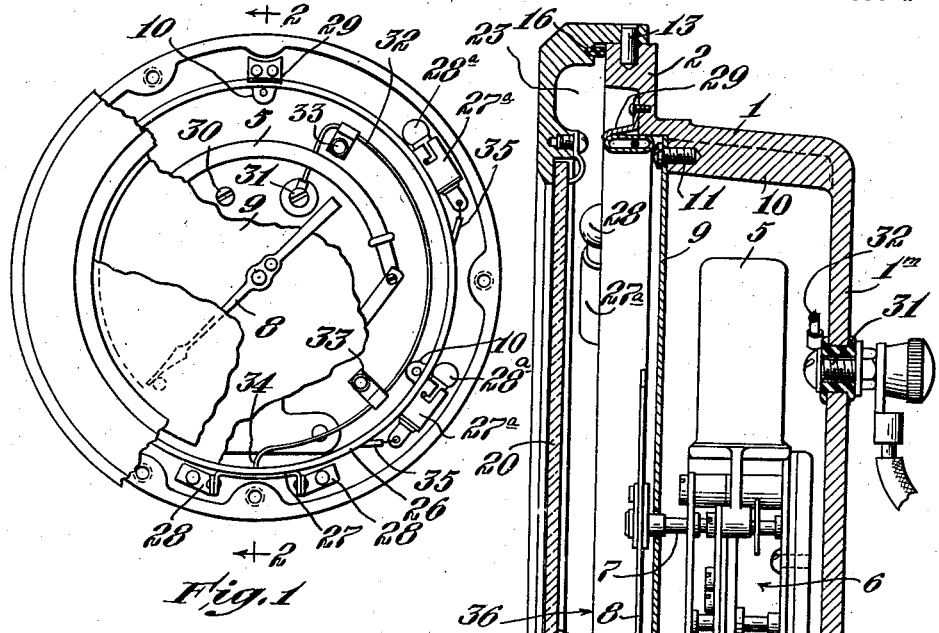
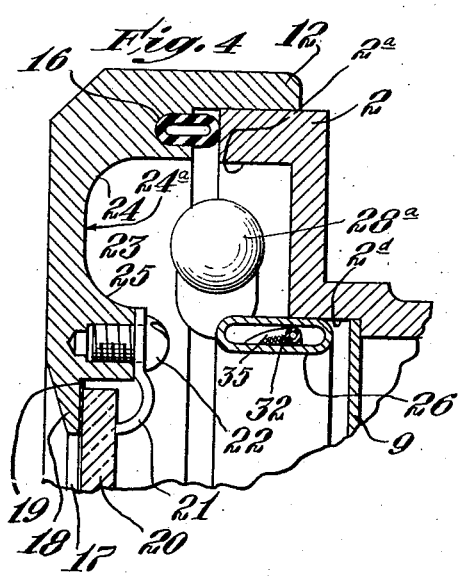
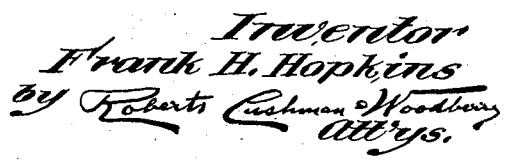
Inventor
Frank H. Hopkins
by Roberts Cushman & Woodbury
Attys.

Patented Oct. 28, 1941

2,261,029

UNITED STATES PATENT OFFICE 2,261,029

INDICATING INSTRUMENT

Frank H. Hopkins, Fairfield, Conn., assignor to Manning Maxwell & Moore, Incorporated, New York, N. Y., a corporation of New Jersey Application March 16, 1940, Serial No. 324,241

6 Claims. (Cl. 240—2.1)

This invention pertains to instruments such for example as pressure gauges or dial thermometers in which a movable index cooperates with a graduated dial or equivalent device, thereby to indicate pressures, temperatures or the like, and relates more particularly to an instrument of this kind having provision for illuminating the dial.

Instruments of this character are frequently installed in poorly lighted locations or at such a distance from the observer that it is difficult to read the position of the index with reference to the graduations on the dial. This difficulty is not satisfactorily solved by the use of exteriorly located lamps for lighting the dial, since the glare from such a lamp and the reflection from the cover glass of the instrument seriously interfere with the vision of the observer. Attempts have heretofore been made to illuminate the dial by the use of lamps placed within the case of the instrument itself, but such prior arrangements, whether devised for direct or indirect lighting, so far as is known to me have proven unsatisfactory for one reason or another, for example, because of the irregular and spotty illumination furnished; the insufficiency of the light furnished; the substantial increase in the dimensions of the gauge case necessary to accommodate the lamps and their fittings; the undue increase in the cost of the instrument by reason of such additional features; or the inaccessibility of the lamps.

The principal object of the present invention is to provide an instrument of the class described having incorporated therein adequate means for uniformly illuminating the dial, the source of illumination being concealed from the eye of the observer and behind the transparent front panel of the instrument.

A further object is to provide dial illuminating means of such character that it may be incorporated in an instrument case whose dimensions do not greatly exceed those of an unilluminated instrument of the same type, and whose external appearance is substantially like that of the usual instrument. A further object of the invention is to provide a dial-illuminating means of a simple but effective type which may be incorporated in the instrument without unduly increasing the cost of the latter. A further object is to provide dial-illuminating means such that the light source or sources is or are easily accessible for renewal and replacement and wherein standard lamps may be employed as the source of light.

Other and further objects and advantages of the invention will be pointed out in the more detailed description and by reference to the accompanying drawings, wherein Fig. 1 is a front elevation of a gauge embodying the invention, portions of the cover and dial being broken away to show the interior construction;

Fig. 2 is a section to large scale on line 2—2 of Fig. 1;

Fig. 3 is a fragmentary section on the same plane as Fig. 2 with the cover removed and showing the lamp-supporting ring swung outwardly from the front of the case;

Fig. 4 is a fragmentary radial section to very large scale, showing details of the gauge cover and case;

Figure 5:
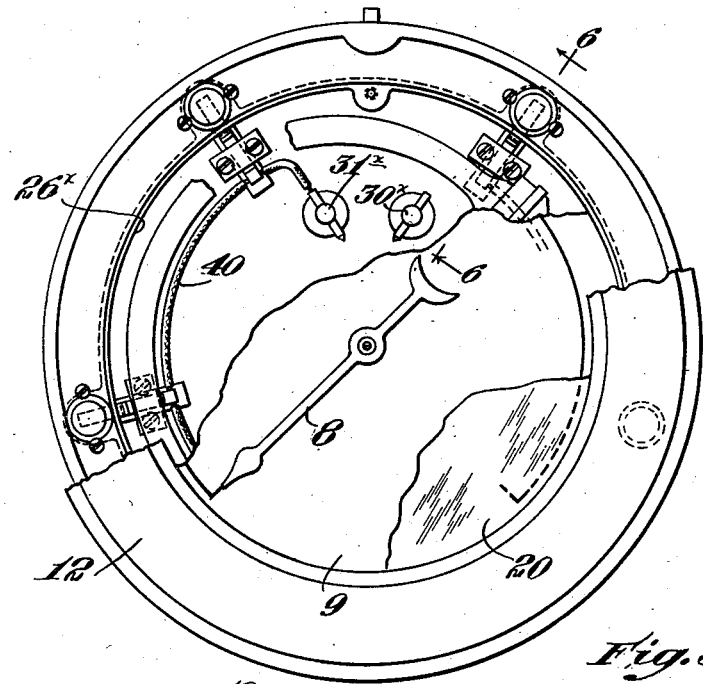
Fig. 5 is a view generally similar to Fig. 1, illustrating a modification.

Referring to Figs. 1 to 4 of the drawings, the numeral 1 designates the side wall of the case of the instrument, such case having the rear wall 1$^m$ and the radial front flange 2, the gauge case being designed to be set substantially flush with a supporting panel or the like. While the invention is herein illustrated as embodied in a gauge having a case of this particular form, it is to be understood that the invention is not limited to such environment.

As illustrated, the rear wall 1$^m$ of the case has an aperture for the reception of the nipple member 3 to which the supply pipe for pressure fluid is connected. This nipple is part of a bracket 4 which is arranged within the case and which is secured to the rear wall of the case in any suitable manner, for example, by means of screws S (Fig. 2). The bracket 4 supports the Bourdon tube 5 and the gauge movement 6, which may be of any desired type, and which includes the staff 7 to the forward end of which is secured the index or pointer 8. This pointer or index cooperates with a dial 9, here shown as fixed at its periphery to lugs 10 (Fig. 1) projecting inwardly from the wall of the case, the dial being secured to these lugs by means of screws 11.

The front of the case is normally closed by a cover which, as here illustrated, comprises an annulus 12 (Figs. 1 and 4) which fits snugly over the outer edge of the flange 2 of the case. In order to hold the cover in position a pin 13 may be arranged to project from the flange 2 into an opening in the annulus at one point, while at a diametrically opposite point a screw 14 passes through an opening in the annulus and has threaded engagement at 15 with an opening in the flange 2. By removal of the screw 14 the cap or cover may be removed from the case to permit access of the interior of the case. Preferably a gasket or packing ring 16 (Fig. 4) is interposed between the rear wall of the annulus 12 and the front face of the flange 2 in order to prevent the entrance of moisture or injurious fumes or the like into the interior of the case. As here shown this gasket consists of a rubber tube which is flattened and seated in a suitable groove in the rear side of the annulus. The annulus has the large central opening 17 defined by a flange 18 having an inner flat surface 19 forming a seat for the transparent panel 20 which may be of glass, a transparent synthetic resin or the like, and which is held in place against the seat surface 19 by means of spaced clips 21 secured to the inner surface of the annulus by screws 22.

The inner surface of the annulus 12, between the outer edge of the transparent panel and the outer periphery of the annulus is furnished with a concentric groove or channel 23 whose forward wall (Fig. 4) comprises one or more arcuate surfaces, for example the surfaces 24 and 25, it being understood that these arcuate surfaces may directly merge if desired so as to form a smoothly curved wall for the groove. As illustrated in Fig. 4, the surfaces 24 and 25 merge with a substantially flat surface 24ª, this arrangement having been found to give highly satisfactory results from the standpoint of uniform lighting of the dial.

Within the case there is arranged a lamp-supporting ring 26 disposed concentrically with the case and preferably fitting snugly against a cylindrical interior surface 2ᵈ of the case, the surface 2ᵈ constituting the wall of a recess within which fits the dial. At its lower part, as illustrated in Fig. 1, the ring 26 is furnished with a bracket 27 having downwardly projecting legs which are interposed between a pair of spaced lugs 28 fixed to the front face of the annulus and to which the legs of bracket 27 are pivotally secured so as to permit the ring to swing about a substantially horizontal axis. The upper part of the case is furnished with a spring clip 29 (Figs. 1 and 2) designed frictionally to engage the upper part of the ring 26 and thus normally to hold the latter in the position shown in Fig. 2. However, by the application of a sufficient force the upper part of the ring may be swung downwardly and forwardly until the ring occupies the position shown in Fig. 3, it being understood, of course, that the cap or cover of the case will have first been removed.

To the outer circumferential surface of the ring 26 a series of lamp sockets 27ª is secured. Each socket has a pair of lamp terminals, one terminal of each pair being grounded to the ring, while the other terminal is insulated from the ring. As illustrated these sockets 27ª are designed for the reception of miniature lamps 28ª having bayonet connections with the sockets. However, it is to be understood that the sockets may be of screw type if preferred, the arrangement illustrated being such that the longitudinal axis of the lamp base is parallel to a tangent to the outer surface of the ring 26.

The back wall 1ᵐ of the case is provided with a pair of binding posts 30 and 31 respectively, to which conductors for electric current may be secured. The post 30 is grounded to the case while the post 31 (Fig. 2) is insulated from the case. From this latter post an insulated conductor 32 extends peripherally of the case inwardly of the ring 26, being supported at spaced points by brackets 33, and enters the interior of the hollow ring 26 substantially at the point 34. The conductor 34 extends about the ring 26 inside of the latter and from this conductor branches 35 extend out to the several lamp sockets 27ª. With this arrangement the several lamps are connected in parallel so that if one lamp burns out the others are not affected.

As illustrated in Fig. 2, the forward edge 36 of the ring 26 is disposed substantially in the plane of the front face of the flange 2 of the case, and the lamp sockets 27ª are so disposed that direct light from the lamps cannot pass over the forward edge of the ring 26 so as to impinge directly on the dial. As illustrated in Fig. 4, the lamp bulbs 28ª are disposed in a channel defined by the inner surface 2ª of flange 2 of the case and the outer peripheral surface of the ring 26 and directly opposite to the channel or groove 23 of the cover. Preferably the inner surfaces 24, 24ª and 25 of the annulus 12 which define the channel 23, are polished or of highly reflecting character, while the inner periphery of the ring 26 is also an effective reflecting surface. With this arrangement, light from each lamp impinges upon the wall of the groove 23 and is reflected by such wall toward the center of the gauge and across the forward edge 36 of the ring 26, some of this light falling directly upon the front face of the dial and some of it being reflected back from the inner surface of the ring 26 at the opposite side of the gauge from that at which the emitting lamp is located. With this arrangement of the lamps a very uniform distribution of light over the entire surface of the dial is assured as well as an adequate intensity of light to provide for readly reading of the instrument. In this connection it is to be noted that the lamp bulbs themselves are concealed from direct view through the transparent panel 20 so that they do not blind the eye of the observer.

Not only is the light which is reflected from the inner surface of the groove 23 and which passes over the edge 36 of the ring 26 reflected back from the opposite side of the ring 26, but some of the light which falls on the inner surface of the groove 23 is passed on around the groove by repeated reflection so that the light from each lamp contributes to the general illumination of the inner surface of the groove 23 and thus helps to insure uniform lighting. It may further be noted that some of the light which is reflected from the inner surface of the ring 26 impinges upon the inner surface of the glass panel 20 at so small an angle that it does not pass through the glass but is reflected back onto the face of the dial thus further adding to the illumination of the latter. The net result is that the dial has a soft, substantially uniform illumination of sufficient intensity to permit ready reading and without noticeably bright spots in the vicinity of the individual lamps.

Figure 6:
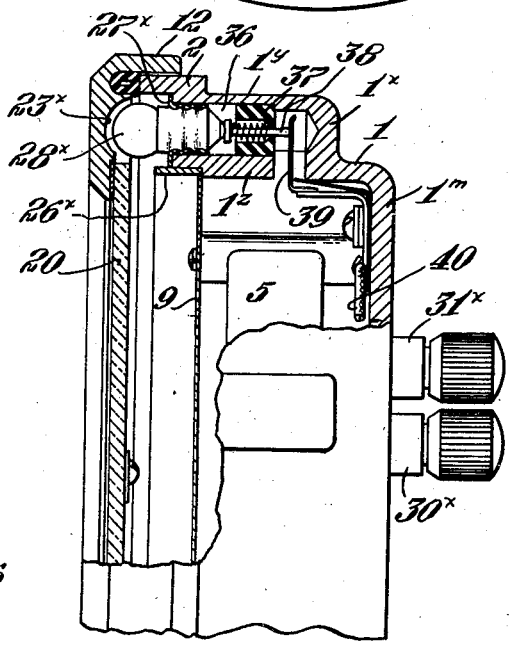
Fig. 6 is a fragmentary section on the line 6—6 of Fig. 5.

While the arrangement illustrated in Figs. 1 to 4 is preferred, somewhat similar results, so far as illumination is concerned, may be obtained by the arrangement of Figs. 5 and 6. In these figures parts corresponding to those of the preceding figures are indicated by the same numerals.

In the arrangement shown in Figs. 5 and 6 the case 1 is furnished with a peripheral offset 1ˣ having the spaced concentric walls 1ʸ and 1ᶻ providing between them a recess 36 in which is seated the series of lamp sockets 27ˣ, these sockets being grounded to the metal of the case. Within the recess 36 is also mounted insulating means 37 in which is disposed a yieldable contact post 38 corresponding to each lamp and whose rear end engages a spring contact 39. The several contacts 39 are connected to a conductor 40, one end of which is secured to the insulated binding post 31ˣ. A second binding post 30ˣ is grounded to the rear wall of the casing, these binding posts corresponding to the binding posts 30 and 31 of Fig. 2.

In this arrangement the ring 26ˣ, which corresponds, so far as its light-intercepting function is concerned, with the ring 26 of the preceding figures, is a plain cylindrical annulus concentric with the dial and having its rear edge substantially in contact with the margin of the dial, the ring 26ˣ being seated in a recess in the wall or partition 1ᶻ of the casing. The ring 26ˣ is of such depth from front to rear as substantially to prevent the direct passage of light from the lamp bulbs 28ˣ mounted in the sockets 27ˣ to the dial. The annulus 12 which forms a part of the cover of the gauge case is furnished with an internal annular groove 23ˣ corresponding to the groove 23 above described and having a curved reflecting wall which reflects the light from the several bulbs both circumferentially of the annulus and also rearwardly across the forward edge of the ring 26ˣ and onto the face of the dial thus providing a substantially uniform illumination for the dial in the same way as above described.

In this arrangement the lamps are fitted in sockets directly mounted in the gauge case and under some conditions it may not be quite so convenient to replace them or to make repairs to the lighting circuit as with the preferred arrangement of Figs. 1 and 2. However, the arrangement in Figs. 5 and 6 is somewhat simpler and may be desirable under some conditions.

While certain desirable embodiments of the invention have been illustrated and described by way of example, it is to be understood that the invention is not necessarily limited to these precise embodiments, but is to be regarded as broadly inclusive of any equivalent constructions whereby the same or similar results are attainable.

I claim:

1. In an instrument of the class described wherein a graduated dial is mounted within a case, in combination, a hollow ring coaxial with the dial and normally housed within the case in coaxial relation to the dial, means normally retaining the ring in operative position within the case but permitting it to be moved forwardly from out of the case, a plurality of spaced electric lamps mounted upon the outer surface of the ring, and conductors housed within the thickness of the ring for supplying current to the lamps.

2. In an instrument of the class described wherein a graduated dial is mounted within a case, in combination, a plurality of electric lamps within the case, a flattened, tubular ring constituting a support for the lamps, said ring normally being coaxial with the dial but being hinged to the case so as to permit it to be swung forwardly from the front of the case, and conductors within the hollow of the ring for supplying current to the lamps.

3. An instrument of the kind wherein a graduated dial is mounted within a case behind a transparent panel which constitutes a portion of a removable cover fitting the front of said case, and wherein light-emitting means is housed within the case forwardly of the plane of the dial, characterized in having a single guard ring coaxial with the dial, the forward edge at least of the guard ring being normally disposed in a plane forward of the dial but spaced behind the inner surface of the transparent panel, the diameter of the guard ring being greater than the effective diameter of the transparent panel portion of the cover, the light-emitting means being mounted upon the exterior of the ring and forwardly of the plane of the dial, the ring being hinged to the case thereby to permit it to be swung forwardly from the front of the case together with the light-emitting means, and means to supply electrical current to the light-emitting means, the marginal part of the cover having an inner surface which is operative to reflect light from the light-emitting means across the forward edge of the ring onto the front face of the dial thereby substantially uniformly to illuminate the latter, the single guard ring being so constructed and arranged as substantially to prevent direct passage of light from the light-emitting means onto the dial.

4. An instrument of the kind wherein a graduated dial is mounted within a case behind a transparent panel carried by a removable ring and, with the latter, constitutes a removable cover fitting the front of the case, in combination, a single substantially cylindrical guard ring of substantial axial width coaxial with the dial and of a diameter greater than the inner diameter of said removable cover ring, said guard ring being within the case and disposed in front of the plane of the dial and having its forward edge spaced rearwardly from the plane of the inner surface of the transparent panel, the inner surface of the guard ring being of light-reflecting character, a plurality of circumferentially spaced electric lamps disposed within the case and mounted upon the exterior of the guard ring, said lamps being located forwardly of the plane of the dial, the removable cover ring having a rearwardly concave reflecting surface operative to reflect light from the several lamps rearwardly across the front edge of the guard ring onto the front face of the dial thereby to assure substantially uniform illumination of the front face of the dial.

5. An instrument of the kind wherein a graduated dial is housed within a case behind a transparent panel carried by a removable annulus and, with the latter, constitutes a cover for the front of the case, in combination a ring coaxial with the dial and a plurality of electric lamps housed within the case and mounted upon the exterior circumference of the ring, the ring being substantially cylindrical, with its forward edge spaced rearwardly relatively to the plane of the inner surface of the transparent panel but forwardly of the plane of the dial, the ring being of a diameter greater than the inner diameter of the annulus thereby concealing the lamps from direct view through the panel, and hinge means connecting the ring to the case and so constructed and arranged as to permit the ring together with the lamps to be swung forwardly from out of the case after removal of the cover.

6. A pressure-responsive instrument having a case comprising a rear wall, a side wall and a removable cover, the latter including a transparent panel, the side wall of the case having therein an internal annular recess whose rear wall constitutes a radial shoulder, a dial within the case, the margin of the dial resting against said shoulder, a single substantially cylindrical guard ring of substantial axial width concentric with the dial and of such external diameter as to fit snugly within said recess with its rear edge adjacent to the plane of the dial and with its forward edge spaced rearwardly from the inner surface of the panel by a distance not substantially exceeding the axial width of the ring, the case having therein an annular space outside of the guard ring and forwardly of the plane of the dial for the reception of light-emitting means, a plurality of spaced light sources located forwardly of the plane of the dial and within said annular space, means for supplying energy to said light-emitting sources, the cover having an annular groove in its inner face coaxial with the dial, said groove having a curved reflecting wall which is concave toward the light sources and so contoured as to reflect light from said sources both circumferentially of the groove and also across the front edge of the ring thereby substantially uniformly to illuminate the front face of the dial, the single guard ring being so located and of such depth from front to rear as substantially to prevent the direct passage of light from the light sources to the dial.

FRANK H. HOPKINS.